Patented Nov. 11, 1930

1,781,370

UNITED STATES PATENT OFFICE

HERMANN DEBOR, OF MUNICH, GERMANY

PROCESS FOR MANUFACTURING RAW-CAOUTCHOUC PLATES

Application filed February 11, 1927, Serial No. 167,569, and in Germany January 26, 1925.

This invention relates to the process of manufacturing reenforced rubber plates and to the product produced in the process.

The invention has for its object to provide a process, of manufacturing raw caoutchouc or rubber plates having a plurality of parallel threads embedded therein, and consists mainly in the manner in which the threads or cords are compressed from their normal diameter to a smaller diameter before being placed in the rubber plate. This object is accomplished by compressing the threads, according to the present invention, by saturating the threads or cords with a solution containing caoutchouc and thereafter passing them through a tapered bore having the dimension of the normal cord or thread at one end and the desired smaller diameter at the discharge end.

Figure 1:
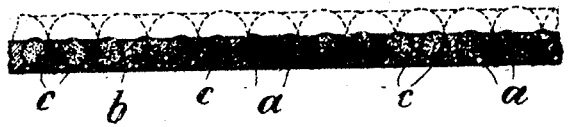
Figure 2:
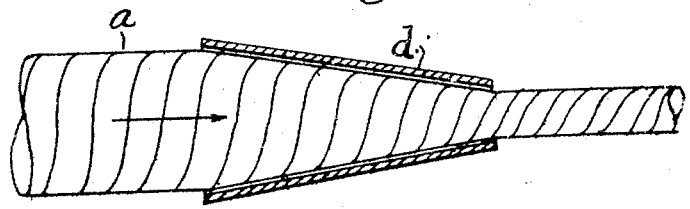

The invention is fully described in the following specification, set forth in the appended claims and illustratively exemplified in the accompanying drawings, in which: Figure 1 is a sectional view of a section of a raw caoutchouc plate manufactured in accordance with the present process; and Figure 2 is a substantially longitudinal view of the device for reducing the diameter of the threads used in the process of producing the improved reenforced rubber plates.

Referring to the drawings, a denotes the cords or threads in their compressed form embedded in the sheet of rolled raw caoutchouc or rubber base b. The threads a are arranged in spaced parallel relation and between the surface of each thread a and one face of the base plate b a thin rubber web or bridge c is left.

The dotted lines, in Figure 1, show the normal diameter of the threads a before being compressed and introduced into the plates b and it will be noted that the reduction effected is substantially one half that of the original size. The step of reducing the diameter of the thread a may be accomplished in a number of devices, and by way of example the device shown in Figure 2 is one of the means which may be used for this purpose. The normal thread or cord a is simply introduced into the cone d at its larger end and by drawing the thread outward through the smaller end of its tapered bore, it is subjected to uniform pressure about its entire periphery until at the point of discharge the cord is reduced to less than its normal diameter without changing the shape of such diameter.

The process herein contemplates the steps which consist in saturating cords with a rubber solution, forcing said saturated cords through a tapered bore in the direction of its smaller end and thereafter embedding the compressed cords into a rubber plate.

Having now described my invention what I claim and desire to secure by Letters Patent is:

1. The herein described process of manufacturing reenforced rubber plates, consisting in applying substantially uniform pressure about the entire periphery of each cord to reduce the diameter of said cords to less that their normal diameter and embedding such cords of reduced diameter in a rubber plate.

2. The herein described process of manufacturing reenforced rubber plates, consisting in treating cords with a rubber solution, applying substantially uniform pressure about the entire periphery of each cord to reduce the diameter of said cords to less than their normal diameter without changing the shape of such diameter, and embedding said cords of reduced diameter in a rubber plate.

3. The herein described process of manufacturing reenforced rubber plates, consisting in saturating cords with a rubber solution, forcing said saturated cords through an orifice of smaller diameter than said cords to thereby exert substantially uniform pressure about the entire periphery of each cord and reduce the diameter of said cords to less than their normal diameter, and embedding said cords of reduced diameter in a rubber plate.

4. As a new article of manufacture, a re-enforced rubber plate comprising a base of rubber having embedded therein cords compressed about their entire periphery, and of less than their normal diameter, said cords spaced from each other with rubber of the plate interposed between adjacent cords.

In testimony whereof I hereunto affix my signature.

HERMANN DEBOR.